United States Patent
Singh et al.

(10) Patent No.: US 8,549,584 B2
(45) Date of Patent: Oct. 1, 2013

(54) PHYSICAL SECURITY TRIGGERED DYNAMIC NETWORK AUTHENTICATION AND AUTHORIZATION

(75) Inventors: Amit Singh, Woodside, CA (US); Prabandham Madan Gopal, Los Altos, CA (US); Manjunath S. Bangalore, Sunnyvale, CA (US); Raman Shankara Krishnan, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 1022 days.

(21) Appl. No.: 11/739,892

(22) Filed: Apr. 25, 2007

(65) Prior Publication Data

US 2008/0271109 A1 Oct. 30, 2008

(51) Int. Cl.
- *G06F 7/04* (2006.01)
- *G06F 15/16* (2006.01)
- *G06F 17/30* (2006.01)
- *H04L 29/06* (2006.01)

(52) U.S. Cl.
USPC ........... 726/4; 726/2; 726/3; 726/21; 713/182

(58) Field of Classification Search
USPC .................................. 726/1–5, 21; 713/182
See application file for complete search history.

(56) References Cited

U.S. PATENT DOCUMENTS

| | | | |
|---|---|---|---|
| 6,088,451 | A | 7/2000 | He et al. |
| 6,374,296 | B1 * | 4/2002 | Lim et al. ............ 709/225 |
| 6,615,264 | B1 | 9/2003 | Stoltz et al. |
| 7,591,020 | B2 * | 9/2009 | Kammer et al. ............ 726/26 |
| 2003/0217122 | A1 * | 11/2003 | Roese et al. ............ 709/219 |
| 2007/0094716 | A1 | 4/2007 | Farino et al. |
| 2007/0162954 | A1 * | 7/2007 | Pela .................... 726/2 |

FOREIGN PATENT DOCUMENTS

WO WO-2008134291 A1 11/2008

OTHER PUBLICATIONS

International Search Report and Written Opinion for PCT Application No. PCT/US08/61084, mailed Jun. 23, 2008, 8 pages.

* cited by examiner

*Primary Examiner* — Ashok Patel
*Assistant Examiner* — Daniel Potratz
(74) *Attorney, Agent, or Firm* — Schwegman, Lundberg & Woessner, P.A.

(57) ABSTRACT

A unified access control component (UACC) can maintain information relating to network access information and physical location information associated with respective users who may access a network that can include network resources (e.g., applications, information). The UACC can cross reference the network access information (e.g., user network access events, credentials, and policy) and physical location information (e.g., user physical access events, credentials, and policy) and can generate and enforce a unified network access policy based on network access information and physical location information associated with a particular user. After network access privileges have been granted to a user, the UACC can continue to monitor the user. The UACC can include a dynamic authentication component that can request a user re-authenticate if a change in the physical location and/or network access associated with the user is detected, such that a re-computation of network access privileges is desired.

13 Claims, 10 Drawing Sheets

NETWORK ACCESS RIGHTS

|   | N | L | M | H |
|---|---|---|---|---|
| N | N | N | N | N |
| L | N | L | L | L |
| M | N | L | M | M |
| H | N | L | M | H |

PHYSICAL ACCESS RIGHTS

FIG. 2

PHYSICAL SECURITY TRIGGERED DYNAMIC NETWORK AUTHENTICATION AND AUTHORIZATION

BACKGROUND

Security of information, assets, and people is a desired objective. Sensitive information can be secured in part by managing access to such information, including access to electronic information, networks, devices associated with networks, and information systems, associated therewith. Managing access can include, for example, requiring authentication or access credentials before allowing access to such information, networks, devices, and information systems. Further, many entities maintain security of their physical premises to secure physical assets, information, and people. Security of a physical premises can include, for example, requiring access credentials for access and monitoring the access of individuals to the physical premises, so it can be reasonably known whether a particular individual is on the physical premises at any given time, and the whereabouts on the physical premises of the particular individual can be reasonably known at any given time.

Electronic devices have become increasingly sophisticated and portable, and remote and wireless connectivity of such devices to access information, other devices, and information systems, has been realized. As a result, challenges can arise with regard to maintaining the security of information (e.g., electronic information), networks, associated devices, and information systems, while still facilitating access to such information, etc., to those persons or entities that can appropriately access same. Thus, there is a desire to secure information, including sensitive information, networks, associated devices, and information systems, by controlling access to such information, etc., utilizing access information associated with both network-associated access and access information associated with the physical location of the device that is requesting access. Further, given the portability and enhanced connectivity of electronic devices, it is desirable to maintain security of information, etc., to ensure that a particular device, and/or entity associated therewith, is authorized to access particular information, networks, devices, or information systems, while at a particular location, even where the device or entity may have originally been granted access at another location.

OVERVIEW

The following presents a simplified overview of the specification in order to provide a basic understanding of some aspects of the technology. This overview is not an extensive overview of the subject disclosure. It is not intended to identify key/critical elements of the subject disclosure or to delineate the scope of the technology. Its sole purpose is to present some concepts of the technology in a simplified form as a prelude to the more detailed description that is presented later.

The technology disclosed herein, in one embodiment thereof, comprises a unified access control component (UACC) that can include one or more servers that can maintain a logical and/or physical database of network access credentials and associated policies and physical access credentials and associated policies. The unified access control component can facilitate management of access by electronic devices, and the users of such devices, that are accessing or attempting to access a particular network. In facilitating management of access to the particular network, including managing authentication of users attempting to access the network, the UACC can determine whether a particular electronic device (e.g., laptop computer, personal digital assistant) can access the network, and determine what level of network access, if any, can be given to a user associated with the electronic device, based not only on network access criteria, but on physical access criteria and other information associated with the physical location of the electronic device and/or user of such device as well. The physical location of a user can be determined using cards and card readers, sensors, or other locating devices, for example, and information associated with physical events associated with the physical location of the user can be monitored, logged, and/or utilized by the UACC and/or a component(s) associated therewith.

The UACC can authenticate user credentials, and can maintain and reference table(s) and/or list(s) that can contain network access credential information, network access policy, physical access credentials, and physical access policy, respectively associated with users, for example. Using such information, the UACC can generate and enforce a unified network access policy that can be based on network access information and physical access information, and such policy can be downloaded to other components, such as the electronic device of the user, associated with the network. A user can have network access to network resources in accordance with the unified network access policy.

In accordance with another embodiment of the disclosed subject matter, after a user and/or electronic device associated with the user has been authenticated by the UACC, the UACC can continue to monitor network access events and physical access events associated with the user and/or the associated electronic device. The UACC can employ a dynamic network authentication component that can request re-authentication of the user and/or device if the UACC detects a change with regard to network access events (e.g., no activity for a period of time) and/or physical access/location events (e.g., the user and/or device moving to a different physical location). The continued monitoring and management of access to the network by the UACC can facilitate securing information and other resources in the network, even where a user is moving with a wirelessly network-connected device from location to location, where some locations may be more secure than other locations.

To the accomplishment of the foregoing and related ends, certain illustrative aspects are described herein in connection with the following description and the annexed drawings. These aspects are indicative, however, of but a few of the various ways in which the principles of the technology can be employed and the subject specification is intended to include all such aspects and their equivalents. Other advantages and features of the technology will become apparent from the following detailed description when considered in conjunction with the drawings.

BRIEF DESCRIPTION OF THE DRAWINGS

FIG. 2 is a table that illustrates an example of access levels in accordance with an embodiment of the disclosed subject matter.

DETAILED DESCRIPTION

Figure 1:
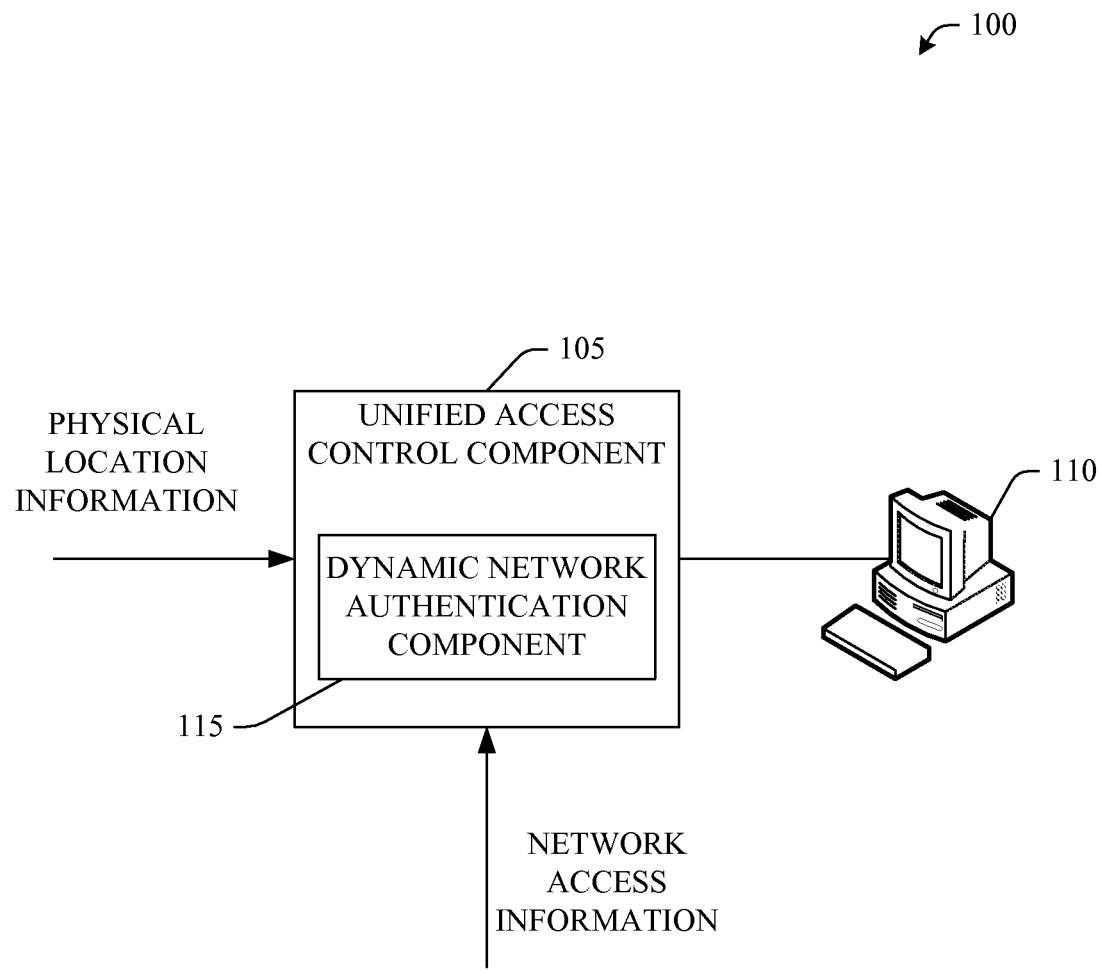
FIG. 1 illustrates a system for management of access to information in accordance with an embodiment of the disclosed subject matter.

The technology is now described with reference to the drawings, wherein like reference numerals are used to refer to like elements throughout. In the following description, for purposes of explanation, numerous specific details are set forth in order to provide a thorough understanding of the features and functionality. It may be evident, however, that the technology can be practiced without these specific details. In other instances, well-known structures and devices are shown in block diagram form in order to facilitate describing the features and functionality.

Due to the portability and wireless connectivity to networks that can be realized with current electronic devices (e.g., computers), challenges can arise with regard to maintaining the security of information (e.g., electronic information), networks, and devices and information systems, associated therewith. In locations where wireless access to networks is less secure, hackers can attempt to access such networks to improperly access network resources. Thus, it is desirable to secure sensitive, confidential, and/or proprietary information, that can be accessed in a network environment, by managing network access privileges of a user based not only on the network credentials and policies, but also credentials and policies associated with the physical location of the user. Further, it is desirable to continue to monitor the physical location and network access of the user in case there is a change in physical location and/or network access, so that action (e.g., re-authentication) can be taken, as desired.

In accordance with one embodiment of the disclosed subject matter, a unified access control component (UACC) can be utilized to manage access to information in a network environment. UACC can generate and enforce a unified network access policy that can be associated with a user accessing the network using an electronic device (e.g., computer). Such policy can be based on physical location information and network access information associated with the user, for example. UACC can receive network access information and physical location information associated with the user and can cross reference the respective information to determine a unified network access policy that can secure network resources (e.g., sensitive electronic information, applications), so that the network resources can be less susceptible to corruption and/or improper access due to the network being compromised by users accessing the network, or parts thereof, while in locations that are less secure. Further, after network access privileges have been granted to a user, UACC can continue to monitor the physical location and/or network access of the user to detect any changes thereto, so that re-authentication of the user and/or termination of the network access can be performed, as desired, if the user and/or the associated device move from a secure location to a less secure location.

Now turning to the figures, FIG. 1 depicts a system 100 that facilitates management of access to information in accordance with the disclosed subject matter. System 100 can include a UACC 105 that can comprise one or more servers that can facilitate managing access to information stored in one or more storage components (not shown) that can be located in a network. One or more computers can be employed to implement the functions of UACC 105, for example. UACC 105 can receive information associated with network access events associated with one or more users and/or one or more electronic devices 110 (e.g. computer, smart phone, personal digital assistant (PDA), etc.) that can be respectively associated with each of the users. Such electronic devices 110 can access the network via wire connections or wireless technology. The UACC 105 can also receive information associated with physical location information respectively associated with each of the users.

UACC 105 can further include a dynamic network authentication component (DNAC) 115 that can reference table(s) and/or list(s) that can include information associated with network access, such as network access credential information, network access policies, and information associated with physical access, such as physical access credential information and physical access policies. DNAC 115 can also validate users that attempt to gain network access as well as request users to re-authenticate, as disclosed supra. UACC 105 can facilitate enforcement of network access policies as it pertains to a respective user.

When a user attempts to log in on an electronic device 110 to access the network and resources associated therewith, DNAC 115 can reference network access information associated with the user, including information regarding network access credentials, network access event information (e.g., log in events, resources accessed, etc.), and/or network access policies. Further, DNAC 115 can reference physical location information associated with the user. Such physical location information can include information provided by location sensors, for example, and/or physical access information, such as physical access credentials, physical access policies, and/or physical access event information (e.g., ingress to or egress from facility (or facilities) or physical spaces therein, as can be observed by readers, keypads, sensors, etc.). UACC 105 can utilize such network access information and physical access information, and such information can be a basis, to determine a level of network access to be granted, if any, to a particular user. UACC 105 can also provide a network access policy that corresponds to the level of network access granted and can enforce such policy.

The types of network access categories, and network access levels respectively associated therewith, can be specified as desired. As one example, there can be four access levels: no access, low-level access, mid-level access, or high-level access. Another example can be normal access, restricted access, or guest access. Further, network access can be implemented by employing Virtual Local Area Networks (VLANs) (e.g., normal, restricted, or guest VLANs), for example. It is to be appreciated that the disclosed subject matter is not limited to the above examples, and the disclosed subject matter can employ any number of levels of network access to facilitate management of access to information.

As an example, a user, who is an employee, may, while at the office of the user, have full network access. However, it may be desired that the user accessing the network remotely from a computer at home or elsewhere outside the facility of the employer only have certain limited network access to maintain security of sensitive or confidential information. If the user attempts to log in to the network remotely, UACC 105 can reference network access information associated with the user and can determine that the user generally can have full network access. UACC 105 can also reference physical access information and can determine that the user does not appear to be located within the facility, and particularly the office of the user. UACC 105 can utilize both the network access information and physical access information to determine a desired level of network access to be granted to the user. As the user appears to be in an area (e.g., home) deemed less secure by the employer, UACC 105 can generate an appropriate network access policy and provide the user a more limited network access, such that the user may only have access to a subset of network resources.

Further, after a user has been authenticated and granted a certain level of network access, UACC 105 can monitor network access and physical location associated with the user. If UACC 105 detects a change in the physical location and/or a change associated with the network access status of the user, such information can be communicated to the DNAC 115, which can utilize such information and reference other network access information (e.g., network credentials, network policy) and physical location information (e.g., physical access policy) to determine whether the change in physical location may result in a re-authentication being requested of the user before network access, as presently granted, should continue, be modified, or be terminated.

For example, if the change in physical location is such that the user has moved from a more secure location (e.g., office), as deemed by an employer, for example, to what may be deemed by the employer as a less secure location (e.g., outside the facility, cafeteria), the DNAC 115 can facilitate re-evaluating the level of network access that can be afforded to the user based on the change in physical location and/or the level of network access presently granted to the user. The level of network access can be re-determined by utilizing the physical location information and network access information, and referencing the aforementioned table(s)/list(s) to determine the network access policy that corresponds with such network access information and physical location information. If the DNAC 115 determines that the change in physical location is such that a re-authentication of the user is desired, then DNAC 115 can request that the user re-authenticate before the user can have any further network access.

Further, based on the network access credentials presented by the user during re-authentication, and the current physical location information associated with the user, the UACC 105 can determine whether there should be a change in the level of network access to be granted to the user. For example, a user can have a wireless electronic device 110 that is authenticated so that the user has a certain level of network access at a physical location that the employer of the user has deemed secure. If the user takes device 110 and moves from the secure location to a physical location deemed less secure, UACC 105 may determine, based on the corresponding network access policy that corresponds with the new physical location and network access credentials, that the user only can be granted a lower network access level than previously granted, even if the network access credentials remain the same.

It is to be appreciated that electronic device 110 can be any electronic device that can communicate with the network. For example, electronic device 110 can include one or more of the following: a computer, personal digital assistant (PDA), network-capable phone, network-capable cellular phone, smart phone, copy machine, television, point-of-sale terminal, manufacturing-related devices, etc.

FIG. 2 depicts a table 200 of an example of access levels in accordance with an embodiment of the disclosed subject matter. Table 200 shows examples of various access levels that can be associated with a network where access can be managed by a unified access control component, such as UACC 105. Table 200 shows, as an example, four levels of network access: no access (N), low-level access (L), mid-level access (M), and high-level access (H). For example, a network management system (e.g., system 100) can employ these four different levels of network access in order to determine what information and other resources (e.g., applications) can be made available to a particular user accessing or attempting to access a network with an electronic device.

Table 200 further shows how the level of access to information and other resources in a network can be dependent not only on the network access rights of a user, but also dependent on the physical location of the user of an electronic device from which the user is attempting to access the network. For example, as can be seen in table 200, if a user has no network access rights to the network, the user will have no network access rights regardless of the physical location of the user. That is, even if the user is in a physical location where it would be possible to have high-level access to the network, the user still does not have any network access rights.

Similarly, if a user has no network access rights to the network based on the physical location of the user and the physical access rights criteria associated with that physical location, the user will have no network access rights regardless of the potential network access rights that the user may have based only on the network access rights associated with the user. That is, even if the user has a certain level of network access rights based only on the network access rights criteria associated with the user, the user still does not have any network access rights.

Table 200 further shows how the network access rights that can be granted to a user of an electronic device upon authentication can be constrained by the physical location of the user, as well as by the network access rights criteria. For example, a user may have high-level network access rights based only on the network access rights criteria associated with the user. However, if the user is in a physical location where the physical access rights criteria specify that only low-level network access can be granted to the user, the user can be granted low-level network access to information and resources associated with the network, even though the user would otherwise qualify for high-level network access. Furthermore, a user is still constrained by the network access rights associated with the user. That is, for example, even if the user is in a physical location associated with high-level access rights, the user is still constrained by the network access rights of the user. So, if the user only has low-level network access rights, the user can only have low-level network access, even if the user is in a physical location associated with high-level network access.

It is to be appreciated that, while table 200 shows four different levels of access, the disclosed subject matter is not so limited and can employ more or less than four levels of access to facilitate management of access to information. Further, the network access constraints depicted in table 200 are just one example of network access constraints that can be employed, and the disclosed subject matter is not so limited. In accordance with an embodiment of the disclosed subject matter, network access constraints can be specified as desired, and UACC 105, for example, can employ and enforce desired network access rights.

For example, it may be desirable, for some reason, to not allow any access rights to a user, where the user and/or device qualify for low-level network access rights based on only the network access rights criteria, and the user is in a physical location associated with high-level access rights based on the physical access rights criteria. One reason may be that a user only qualifying for low-level network access rights should not be in a physical location associated with high-level access rights, which can be known by the UACC 105, and therefore, such attempt to access the network from such physical location may be suspicious and access to the network can be denied by the UACC 105.

Figure 3:
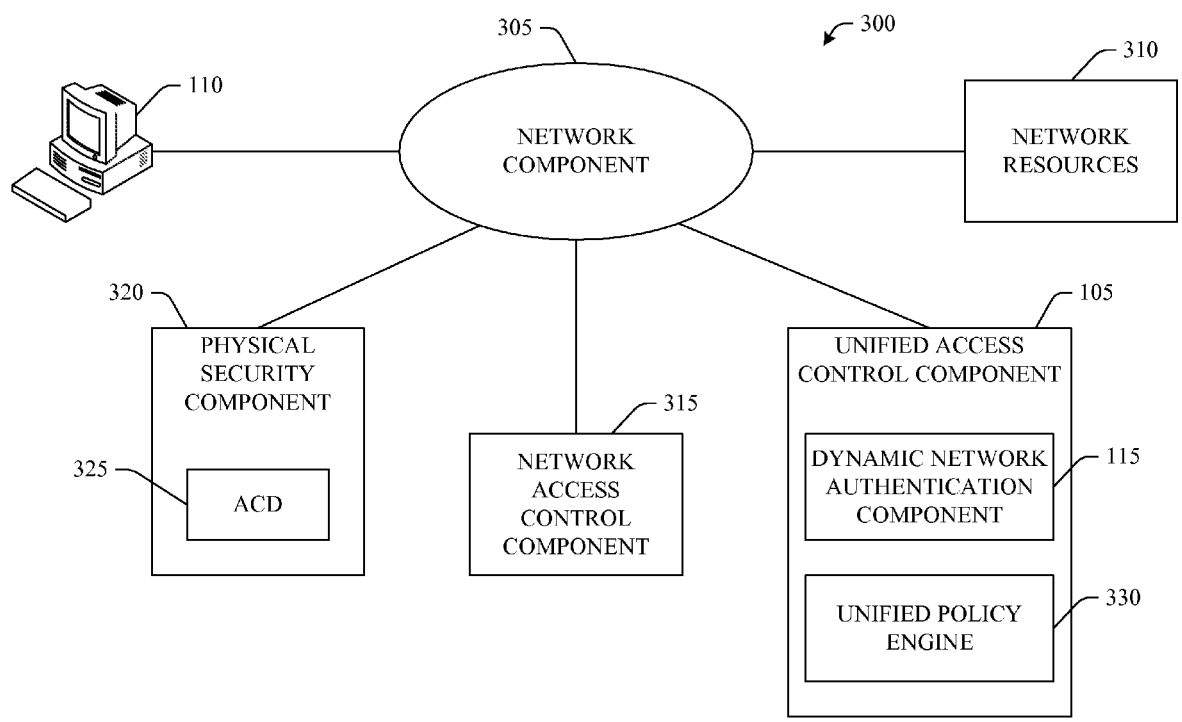
FIG. 3 depicts a system for management of access to information in accordance with an embodiment of the disclosed subject matter.

Turning to FIG. 3, illustrated is a system 300 that can facilitate management of access to information in accordance with the disclosed subject matter. System 300 can include a UACC 105 that can be associated with a network component 305, and can include one or more servers that can unify network access authentication and associated network policies with physical access and associated physical access policies. Such unification can facilitate security of resources 310 (e.g., information, databases, applications, Internet, etc.) associated with the network. Network component 305 can route information to or from components in system 300. For example, network component 305 can be a frame/packet based network component (e.g., Internet Protocol (IP)-based network) that can connect components of system 300 such that data can be communicated between components in system 300. Network component 305 can include network infrastructure devices, such as routers, switches, firewalls, etc., to transmit information to network edge-attached devices, such as the aforementioned electronic devices 110 (e.g., computer, PDA). Further, network component 305 can support wireless transmission of information.

UACC 105 can be associated with a network access control component (NACC) 315 via network component 305, and NACC 315 can provide UACC 105 with information associated with network access associated with one or more users and/or one or more electronic devices 110 that can be respectively associated with each of the one or more users. NACC 315 can be one or more servers that can manage user credentials and network access policy. NACC 315 can propagate user credential information, and updates thereto, and network access policy, and revisions thereto, to UACC 105. UACC 105 can utilize the user credential information to validate users attempting to access resources in the network. Further, UACC 105 can utilize the network access policy, along with other information (e.g., physical location information), to determine whether to grant network access to a particular user and, if so, the level of access to be granted to the user. Further, NACC 315 can facilitate enrollment of new devices (e.g., electronic devices 110) when such devices are added to the network.

UACC 105 can also be associated with physical security component 320 via network component 305, and physical security component 320 can provide to UACC 105 physical access credential information associated with respective users and the physical access policy associated with one or more facilities. Physical security component 320 can include one or more servers that can manage user credentials and network access policy. Physical security component 320 can provide UACC 105 with updates or revisions to physical access credentials and the physical access policy, as physical security component 320 can facilitate managing user physical access credentials, including new and expired physical access credentials. Physical security component 320 also can facilitate enrollment of new physical access devices, such as access control devices (ACD) 325 (e.g., card readers, keypads, etc.) that can be part of physical security component 320.

ACDs 325 can include, for example, card readers, biometric readers, keypads, electromechanical locks, physical location/motion sensors, etc. For example, card or badge readers that can scan cards or badges where such cards or badges can include user credential information, and such credentials can be analyzed by UACC 105 and compared to credential information on file to determine whether a particular user can be granted access to a facility, or a physical location therein, in accordance with the applicable physical access policy. Biometric readers can scan and analyze physical attributes of a user, such as fingerprint, retina, facial features, and information associated with one or more of these physical attributes can be utilized to determine whether the user can be granted physical access to the facility, or some physical location therein. Keypads can be utilized to require a user to enter an appropriate password before access can be granted to the physical location. The ACDs 325 can be network-capable to communication information via a frame/packet network, and/or communication of information between ACDs 325 and other components (e.g., UACC 105) in system 300 can be facilitated by other components (not shown) to convert or translate the information into a form that can be communicated via network component 310.

By employing UACC 105, NACC 315 and physical security component 320 can each be subscribers to events in the other domain, as NACC 315 can subscribe to physical events and the physical security component 320 can subscribe to network events. UACC 105 can facilitate cross referencing network state, access credentials and policies based on physical access events, and physical access state, credentials, and policies based on network access events, and take desired actions based on the knowledge of information associated with both domains, the network domain and physical access domain.

UACC 105 can generate unified network access control policies that can govern network access by respective users disposed in the network, and can enforce such policies. The unified network access control policies can account for not only network credentials associated with a user, but also physical location information associated with the user. UACC 105 can then propagate an appropriate network access control policy to devices (e.g., electronic devices 110, such as a computer or PDA) in the network, and these devices can implement the desired policy, as specified by UACC 105.

UACC 105 can employ a DNAC 115 that can reference table(s) and/or list(s) that can include information associated with network access, such as network access credential information, network access policies, and information associated with physical access, such as physical access credential information and physical access policies. DNAC 115 can also validate users that attempt to gain network access as well as request users to re-authenticate, as desired.

When a user attempts to gain network access, such as by logging in on an electronic device 110, in order to access resources associated with the network, DNAC 115 can receive and/or reference network access information associated with the user, including information regarding network access credentials, network access event information, and/or network access policies. Network access information can include information regarding log in events, accessed resources (e.g., information, databases, applications), associated with the user, for example. Further, DNAC 115 can receive and/or reference physical location information associated with the user. Such physical location information can include physical access event information, physical access credentials, and/or physical access policies. Physical access event information can include information regarding ingress to or egress from one or more facilities, or physical locations therein, associated with the user, where such information can be obtained from ACDs 325 (e.g., readers, keypads, sensors, etc.), for example. UACC 105 can cross reference such network access information and physical access information to determine a level of network access to be granted, if any, to a particular user. UACC 105 can include a unified policy engine 330 that can generate and distribute a unified network access policy and enforce such policy, and such policy can be downloaded, along with associated actions, to the relevant set of servers (e.g., NACC 315, physical security component 320) and devices 110 (e.g., computer, PDA). The unified network access policy can correspond to the level of network access granted to the user.

As an example, UACC 105 can employ one or more applications that can define network access levels and permissions for information associated with the employer. Access information can include a user name and password and a role that can define current network access level privileges in the network domain as well as physical access credentials contained in a badge of the employees in the physical access domain.

An employee may have been given the authority to access critical information, such as human resources information, that can be accessed by a certain network application. The employee can present network access credentials by logging in on a laptop computer 110 and presenting a username and password, for example. The employee presents valid network access credentials that can be verified by DNAC 115, where such credentials would otherwise permit the employee to access the application and critical information.

However, before granting network access to the employee to allow the employee to access the application and critical information, UACC 105 can determine the physical location of the user. If UACC 105 determines that the employee is in an area that is predetermined to be a secure area, where the employee can have network access privileges to network resources (e.g., application and critical information) in accordance with the network access privileges associated with the network credentials of the employee, UACC 105 can generate a network access policy that grants the employee such network access privileges and provide such policy so that it can be implemented. However, if UACC 105 determines that the employee is not in an area that is predetermined to be a secure area, UACC 105 can take other actions, and can generate a network access policy to enforce such actions, to facilitate securing the network resources. Such other actions can include, for example, denying network access, enabling portions of the network resources (e.g., application), providing access in view-only mode without allowing any data to be downloaded to the laptop 110, and/or freezing any data download transactions, etc.

Further, after a user has been authenticated and granted a certain level of network access, UACC 105 can monitor network access and physical location associated with the user. If UACC 105 detects a change in the physical location and/or a change associated with the network access status of the user, such information can be communicated to the DNAC 115, which can utilize such information and reference other network access information (e.g., network credentials, network policy) and physical location information (e.g., physical access credentials, physical access policy) to determine whether the change in physical location makes it desirable to request re-authentication of the user before allowing further network access. Further, if re-authentication is requested, such information, including information regarding the change in physical location, can be utilized to determine the level of network access to be granted, if any, and thus, the network access may be modified, termination, or continued as originally granted, as desired by UACC 105, and in accordance with the new unified network access policy generated by UACC 105.

For example, an employee may have been granted a certain level of network access by UACC 105, based on access credentials (e.g., username and password) that authorized the employee to access critical and sensitive information of the employer, such as information regarding credit cards of customers of the employer, and further based on physical access event information and credentials associated with the employee that showed that the employee was located in the office of the employee at the time of the log in request, where the office was included in a list of areas predetermined to be a secure area. If the employee is using a laptop computer 110 and maintaining a wireless network connection to the network, and the employee moves to a different physical location, UACC 105, which can monitor such changes in location, can re-evaluate the network access rights of the employee. The change in physical location can be observed by a card reader, for example, that scans the badge of the employee as the employee leaves the secure area where the office is located.

If the employee moves to an area that is predetermined to not be on a list of secure areas, DNAC 115 can request that the employee re-authenticate before further network access can continue, and the network access level can be re-computed, or UACC 105 can terminate the network connection and request that the employee re-authenticate. UACC 105 can use the current network credential information provided during re-authentication, and the current physical location information, to re-compute a network access level. UACC 105 can then generate a new network access policy that can correspond to the re-computed network access level, and propagate the policy to the laptop 115, and such policy can be implemented and enforced.

In accordance with one embodiment of the disclosed subject matter, UACC 105 can implement the functions of one or more servers associated with the NACC 315 and physical security component 320. UACC 105 can employ one or more servers to implement the network security functions of NACC 315, and can employ one or more servers to implement the physical security functions of physical security component 320, although component 320 can still perform its other functions, as directed by UACC 105.

It should be noted that authentication can be performed utilizing most any desired technology. In accordance with one embodiment of the disclosed subject matter, network equipment and users attempting to gain access to the network can be authenticated via 802.1x and applicable versions of Extensible Authentication Protocol (EAP). Further, UACC 105, and DNAC 115, can perform authentication using Remote Authentication Dial In User Service (RADIUS). RADIUS can include mechanisms that can facilitate DNAC 115 triggering re-authentication based in part on timeouts that can be set at the time of the previous successful authentication. For example, RADIUS attributes can specify a timeout interval in seconds when session-timeout occurs to trigger re-authentication and/or the session terminates after being up for the specified number of seconds. The timeouts can be set to small values to ensure that the window of operation with network access privileges is small, so that the triggered session re-authentication or termination can help keep the network infrastructure secure.

Further, UACC 105 can facilitate the operation of a posture validation and network authentication application that can facilitate evaluating posture and substantially instantaneously can result in DNAC 115 triggering re-authentication by the user and/or disconnecting the user from the network based on the current posture of the electronic device 110 by, for example, issuing an Extensible Authentication Protocol Over Local area network (EAPOL) start to the connected authenticating device 110. Such mechanism of triggering re-authentication can be preferred as there is no window in which the electronic device 110 might operate with inappropriate network access privileges.

Figure 4:
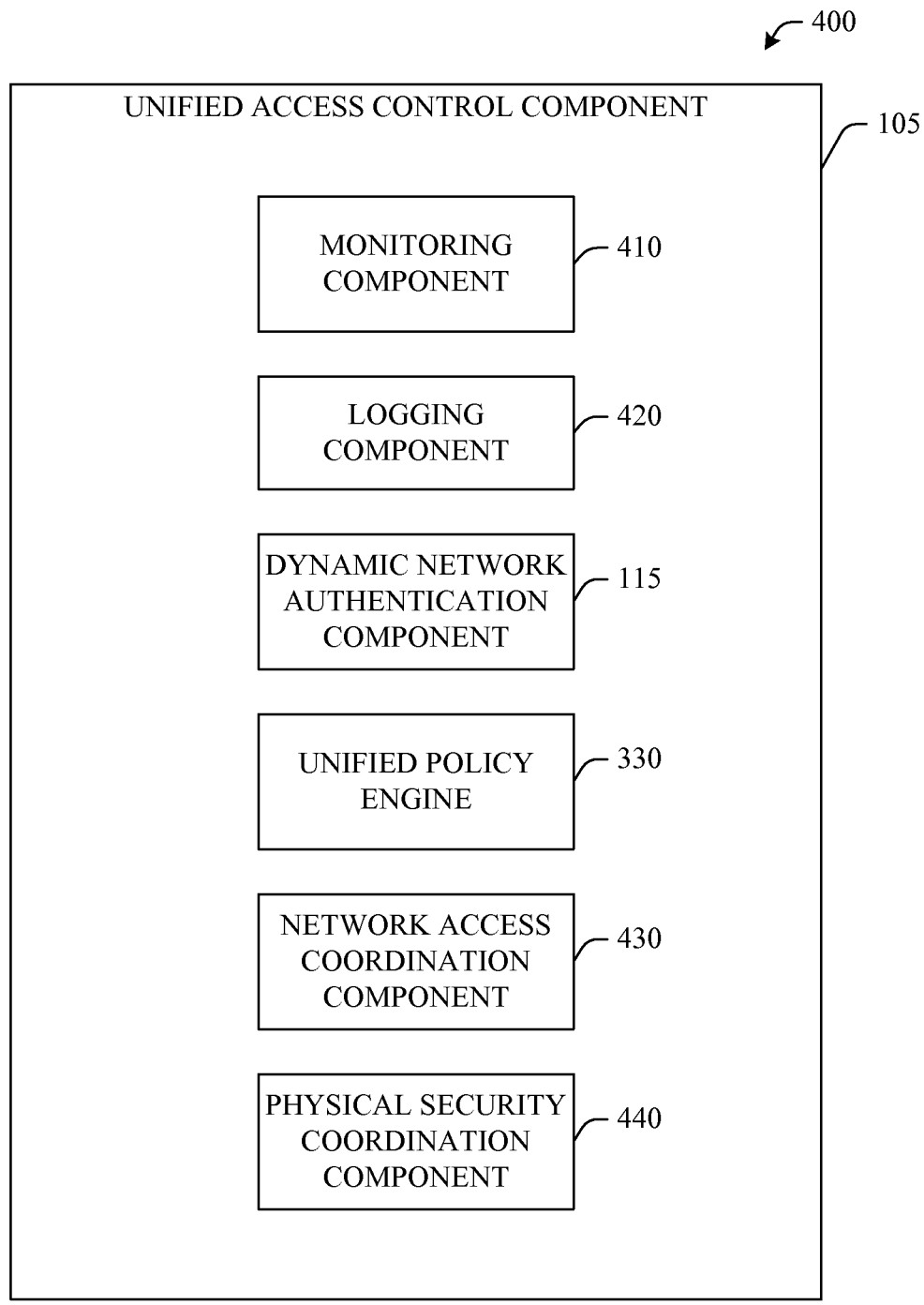
FIG. 4 illustrates a block diagram of a unified access control component in accordance with an embodiment of the disclosed subject matter.

Referring now to FIG. 4, illustrated is a block diagram 400 of UACC 105 in accordance with an embodiment of the disclosed subject matter. UACC 105 can include a monitor component 410 that can monitor network access events associated with respective users accessing or attempting to access the network as well as monitor physical location events, including physical access events, associated with users accessing the facility or facilities, and parts therein (e.g., offices, rooms, etc.). Monitor component 410 can receive information associated with network access events (e.g., log in attempts, resources accessed, etc.) by monitoring electronic devices (e.g., computer, PDA, etc.) that connect or log in, or attempt to log in, to the network, for example. Monitor component 410 can receive information associated with physical location events by, for example, monitoring activity at card readers, keypads, and/or other security devices, that can be situated at ingress and egress points of a facility (e.g., building, parking lot, etc.) as well as in other locations within the facility; and location sensors within (and outside) a facility. UACC 105 can also include a logging component 420 that can log and store information received by the UACC 105, such as the network access information and physical location information received by monitoring component 410.

UACC 105 can further include a DNAC 115 that can reference table(s) and/or list(s) that can include information associated with network access, such as network access credential information, network access policies, and information associated with physical access, such as physical access credential information and physical access policies. DNAC 115 can also validate users that attempt to gain network access as well as request users to re-authenticate, as desired, if a change is detected with regard to physical location and/or network access with regard to a user.

When a user attempts to log in on an electronic device 110 to access the network and resources associated therewith, DNAC 115 can reference network access information associated with the user, including information regarding network access credentials, network access policies, and/or network access event information. Further, DNAC 115 can reference physical location information associated with the user, such as physical access credentials, physical access policies, and/ or physical access event information. Based on the network access information and physical access information associated with a particular user, DNAC 115 can determine a level of network access to be granted, if any, to the particular user.

Further, after a user has been authenticated and granted a certain level of network access, monitoring component 410 can continue to monitor network access and physical location associated with the user. Also, logging component 420 can continue to log such information. If monitoring component 410 detects a change in the physical location and/or a change associated with the network access status of the user, such information can be communicated to the DNAC 115, which can utilize such information and reference other network access information (e.g., network credentials, network policy) and physical location information (e.g., physical access policy) to determine whether re-authentication should be performed to require the user to provide network access credentials (e.g., username/password, biometric information, etc.), due to the change in physical location, before network access, as presently granted, should continue, be modified, or be terminated, for example.

UACC 105 can also include a unified policy engine 330 that can generate and distribute a unified network access policy and enforce such policy. Such policy can be downloaded, along with associated actions, to the relevant set of servers and devices 110. The unified network access policy can correspond to the level of network access granted to the particular user.

UACC 105 can include a network access coordination component 430 that can coordinate the exchange of information between the NACC 315 and UACC 105. For example, network access coordination component 430 can facilitate obtaining information associated with network access (e.g., network access credentials, network access policy) from NACC 315. UACC 105 can also include a physical security coordination component 440 that can coordinate the exchange of information between the physical security component 320 and UACC 105. For example, physical security coordination component 440 can facilitate obtaining information associated with physical access (e.g., physical access credentials, physical access policy) from physical security component 320.

Figure 5:
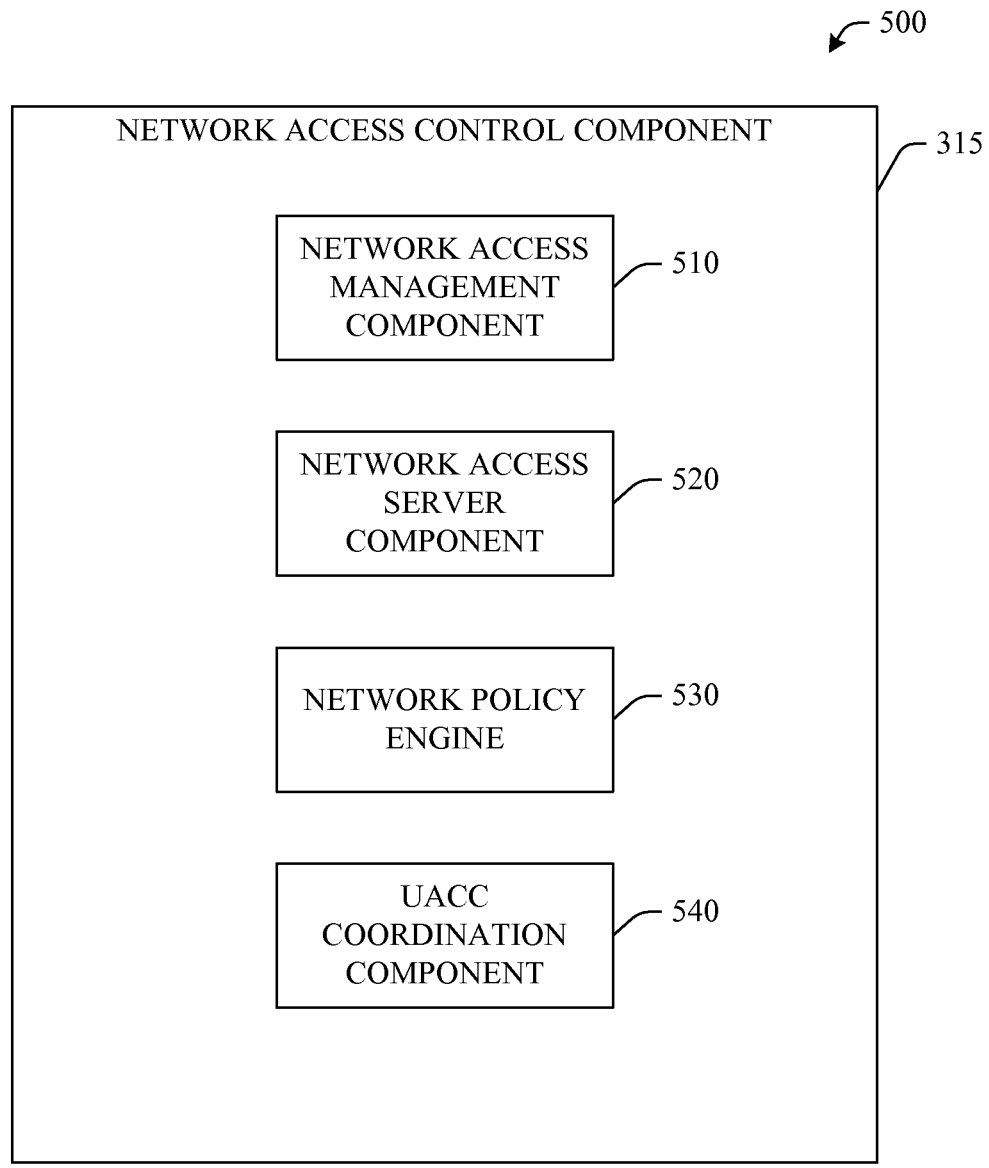
FIG. 5 depicts a block diagram of a network access control component in accordance with an embodiment of the disclosed subject matter.

FIG. 5 depicts a block diagram 500 of NACC 315 in accordance with an embodiment of the disclosed subject matter. NACC 315 can include a network access management component 510 that can facilitate management of network access to a network. Network access management component 510 can be associated with network access server component 520, which can reference network access information associated with one or more respective users from a table(s) and/or list(s) associated with the users. Such information can include network access credentials of respective users, and network access policies of respective users. NACC 315 can further include a network access policy engine 530 that can facilitate the generation of a network access policies respectively associated with users, as well as updates to such policies. NACC 315 also can employ a UACC coordination component 540 that can facilitate communicating network access information to UACC 105, so that UACC 105 can utilize such information in developing a unified network access policy.

Figure 6:
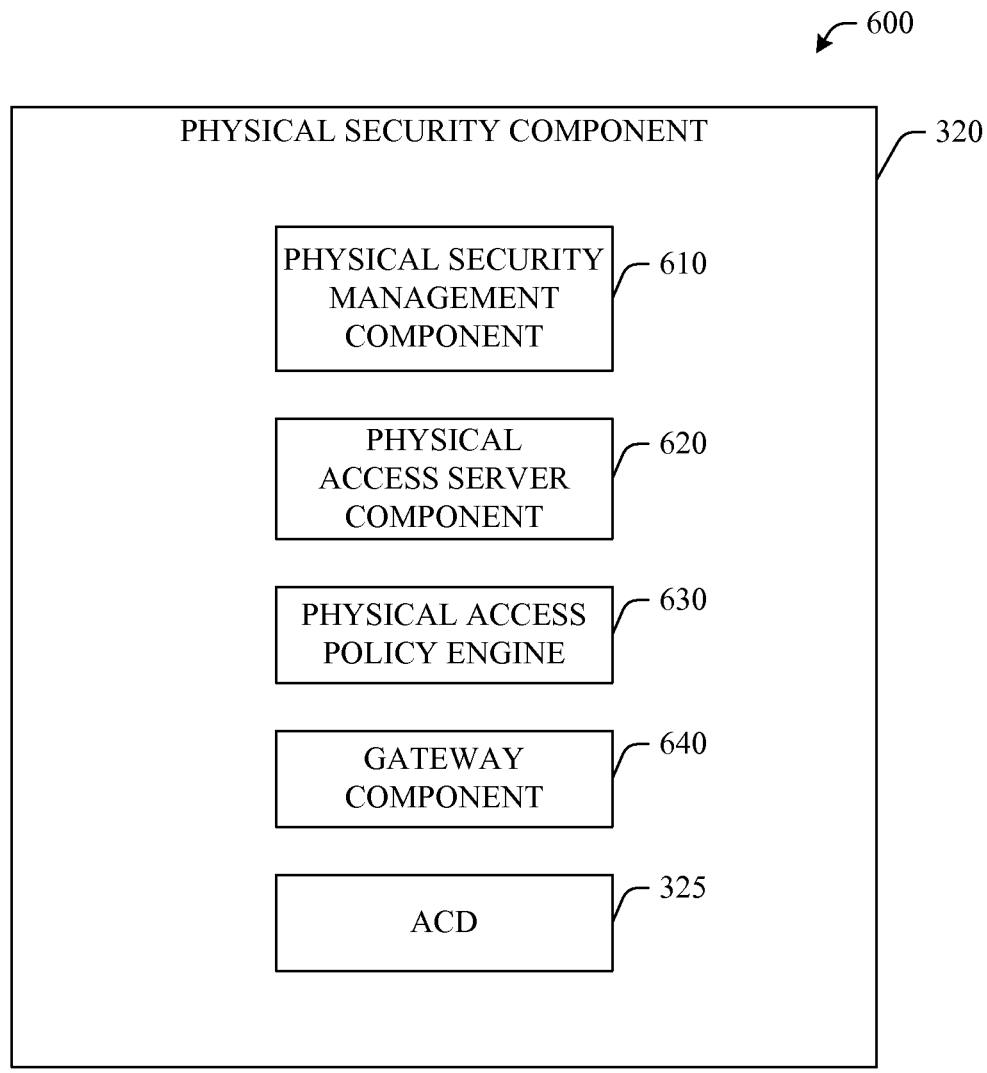
FIG. 6 illustrates a block diagram of a physical security component in accordance with an embodiment of the disclosed subject matter.

Turning to FIG. 6, illustrated is a block diagram 600 of a physical security component 320 in accordance with an embodiment of the disclosed subject matter. Physical security component 320 can include a physical security management component 610 that can facilitate management of physical access to and within one or more facilities associated therewith. Physical security component 320 can further include a physical access server component 620 that can include a database that can include information associated with the physical access state, physical access credentials, and/or physical access events, respectively associated with a plurality of users associated with the one or more facilities.

Physical access server component 320 can also be associated with physical access policy engine 630 that can implement and enforce physical access policies associated with the physical access of respective users to the one or more facilities, and physical areas contained therein. Information regarding the physical location of respective users can be obtained from one or more ACDs 325 that can be distributed throughout the one or more facilities, as desired. For example, ACDs 325 can be positioned at an entrance to a facility parking lot, an entrance to the facility itself, and/or at an entrance to a secure area or room, for example. Examples of ACDs 325 can include card readers, biometric readers, keypads, electromechanical locks, physical location/motion sensors. For example, card or badge readers that can scan cards or badges where such cards or badges can include user credential information. Biometric readers can scan and analyze physical attributes of a user, such as fingerprint, retina, facial features, for example. Keypads can be utilized to require a user to enter an appropriate password before access can be granted to the physical location.

Physical security component can include a gateway component 640 that can facilitate communication of physical location information between the ACDs 325 and the physical access server component 620 and/or UACC 105 via network component 305, where the ACDs are not structured so as to be able to directly communicate such information via the network component 305. For example, if network component 305 is a frame/packet based network, gateway component 640 can facilitate translating information it receives from ACDs 325 that are not network capable into information that can be communication via network component 305. Further, gateway component 640 can facilitate translating information from the physical access server component 620 and/or UACC 105 that is directed to an ACD 325 that is not network capable, so that such information can be communicated to, and understood by, the ACD 325, so the ACD 325 can take the appropriate action.

Figure 7:
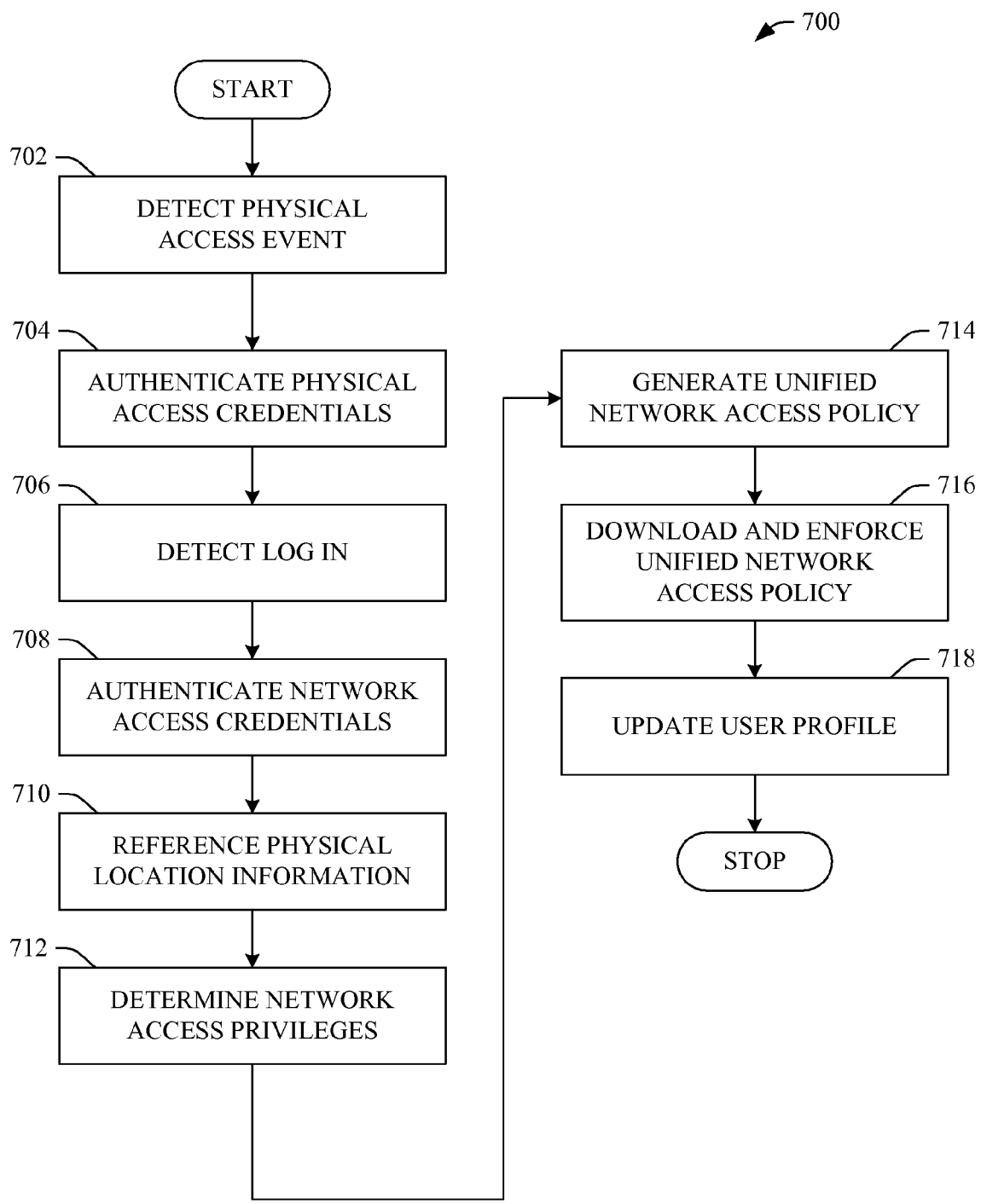
FIG. 7 illustrates a methodology that facilitates managing access to information in accordance with an embodiment of the disclosed subject matter.
Figure 8:
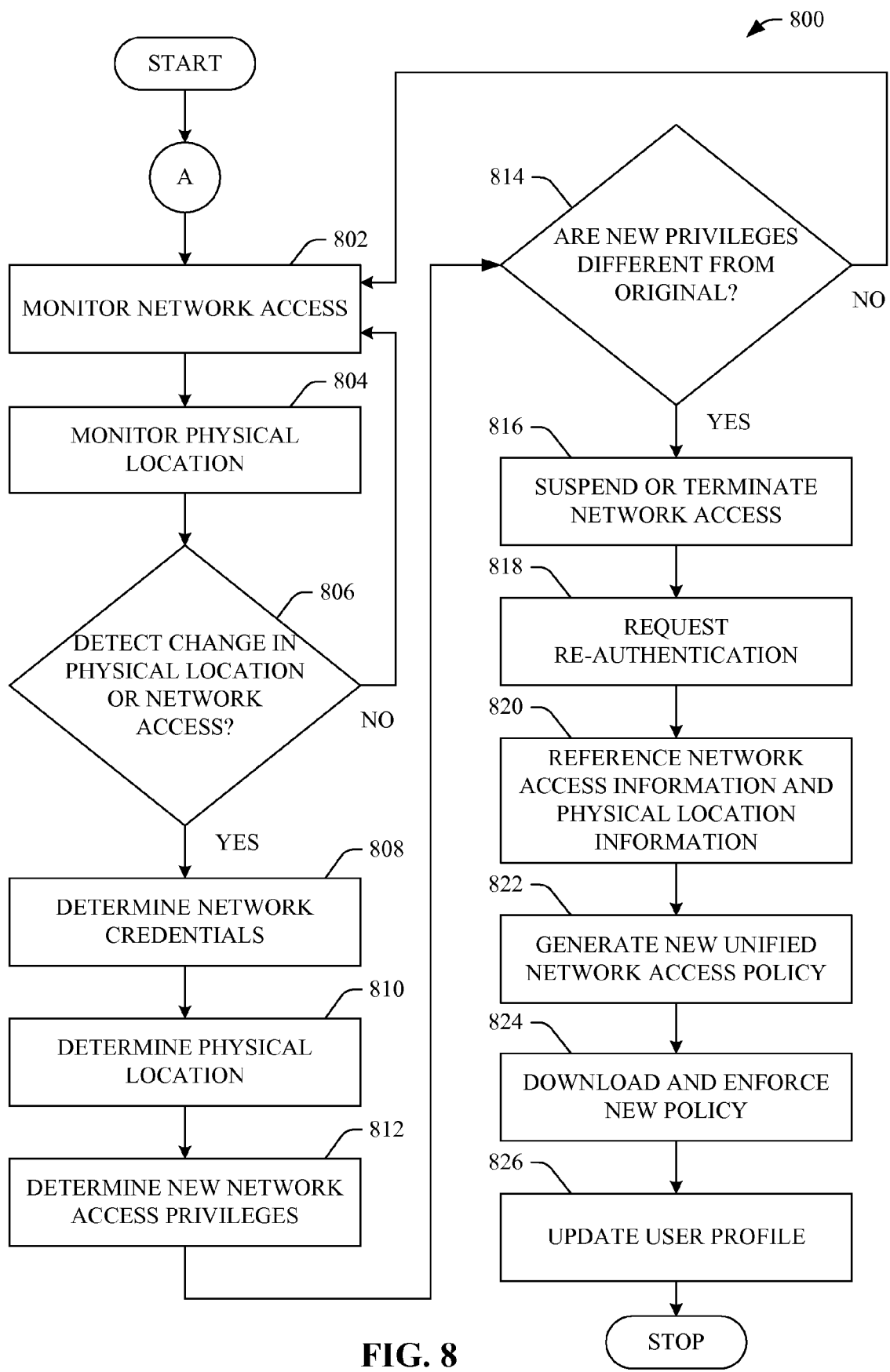
FIG. 8 illustrates a methodology that facilitates managing access to information in accordance with an embodiment of the disclosed subject matter.

FIGS. 7 and 8 illustrate methodologies in accordance with the subject disclosure. For simplicity of explanation, the methodologies are depicted and described as a series of acts. It is to be understood and appreciated that the subject disclosure is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 7 illustrates an example methodology 700 for managing access to information in accordance with an embodiment of the disclosed subject matter. At 702, a physical access event can be detected. For example, the detection of a physical access can be associated with an access control device (ACD) 325, such as card reader, biometric scanning device (e.g., scanning of a fingerprint, retina, etc.), a sensor, a keypad, etc., or a combination thereof, associated with a physical location. A physical access event can be detected, for example, when a card is read, biometric scanning is performed, a sensor is triggered, a password is input to a keypad, etc., or a combination thereof, respectively. At 704, authentication of the physical access credentials of a user accessing the ACD can be performed, for example, by UACC 105.

At 706, a log-in on an electronic device (e.g., computer, PDA) by the user to attempt to gain network access can be detected, for example, by UACC 105. The log-in event can be in any desired form of logging in, such as inputting a username and/or password into a keyboard, biometric scanning, scanning a card, etc., for example. At 708, the network access credentials of the user can be referenced from a table, for example, that can be accessed by the UACC 105, and authentication of the network access credentials of the user can be performed. At 710, the physical location information associated with the user can be referenced by UACC 105. Such physical location information can include physical access credentials, physical access policy, and physical access event information, associated with the user.

At 712, the network access privileges of the user can be determined, for example, by UACC 105. The network access privileges can be determined based not only on the network access information associated with the user, but also physical location information associated with the user. At 714, UACC 105 can generate a unified network access policy that can identify the network access privileges granted to the user. At 716, the network access policy can be downloaded to the electronic device 110 on which the user is attempting to access the network resources and enforced. At 718, the user profile can be updated, so as to document the network access event information associated with logging in to the network. Such update can include information, such as identifying the device (e.g., computer) the user is using to access the network, the time of such access, the network access privileges granted, the network resources accessed, the physical location where the network access occurred, etc. At this point, methodology 700 can end.

FIG. 8 illustrates a methodology 800 for managing access to information in accordance with an embodiment. At point A, a user can previously be granted a certain level of network access based on network access information (e.g., credentials) and physical access information (e.g., physical location), associated with the user, for example. At 802, network access of a user and/or an electronic device associated with the user can be monitored, for example, by the monitoring component 410 associated with UACC 105. For example, network access can be monitored with regard to the information the user is accessing, or attempting to access, to determine whether it is in accordance with the network access rights granted to the user. For example, the user may be using an application for which the user has previously been granted network access. Subsequently, the user attempts to access a different application in the network, and information associated with this network access event can be monitored, for example, by the monitoring component 410.

At 804, the physical location of the user can also be monitored, for example, by the monitoring component 410. For example, the physical location of the user, or an approximate or expected location of the user, may be determined from information associated with physical access events associated with the user. Monitoring component 410 can receive such information, as such information can be transmitted to the UACC 105 when physical access events occur.

At 806, a determination can be made as to whether a change of physical location and/or network access has been detected. If no change has been detected, there can be a return to 802 to continue monitoring network access associated with the user, and proceeding through methodology 800 therefrom. If, at 806, a change has been detected, then at 808, the network access information associated with the user can be referenced to determine the current potential network access rights associated with the user, where network access rights that may ultimately be granted can be based on physical location information as well. Such change can be a change in physical location, such as where the user has a wireless electronic device 110 (e.g., computer, PDA) which is being used to access the network and the user takes such device into a different physical location, for example. Another example can include a change in network access, such as an updated network access policy associated with the user is generated while the user is already accessing the network under the old policy. At 810, physical location information associated with the user can be analyzed to determine the current physical location associated with the user.

At 812, a determination of network access privileges of the user can be made based on the current network access information and current physical location information associated with the user. At 814, a determination can be made as to whether the network access privileges associated with the current information is different from the previously granted network access privileges. That is, it can be determined whether the change in physical location and/or network access associated with the user is such that it is desirable that the network access privileges be changed. If, at 814, it is determined that there is no change in network access privileges as a result of the change of physical location and/or network access of the user, there is a return to 802, where monitoring of the user can be continued, and the network access privileges of the user can continue. If, however, at 814 it is determined that the change in physical location and/or network address associated with the user results in a change in network access privileges that can be granted to the user, then, at 816, network access can be suspended or terminated, as desired.

At 818, the user can be requested to re-authenticate, for example, by providing authentication credentials (e.g., username/password, biometric information, key card information, etc.). At 820, the UACC 105 can reference network access information, including the current credentials provided by the user, and physical location information associated with the user, including the current physical location information of the user. At 822, a new unified network access policy can be generated, for example, by the unified policy engine 330, based on the network access information and physical location information of the user. At 824, the new unified network access policy can be enforced by the UACC 105 and downloaded to the electronic device 110 associated with the user. At 826, the profile of the user can be updated to include all information as to network access and physical location gained since the last update of the user profile. Such update can include information regarding identifying the device 110 (e.g., computer) the user is using to access the network, the time of such access, the network access privileges granted, the network resources accessed, the physical location where the network access occurred, identifying the ACD 325 associated with the physical location of the user, etc. At this point, methodology 800 can end.

As utilized herein, terms "component," "system," "interface," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the disclosed subject matter.

Some portions of the subject disclosure have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

Figure 9:
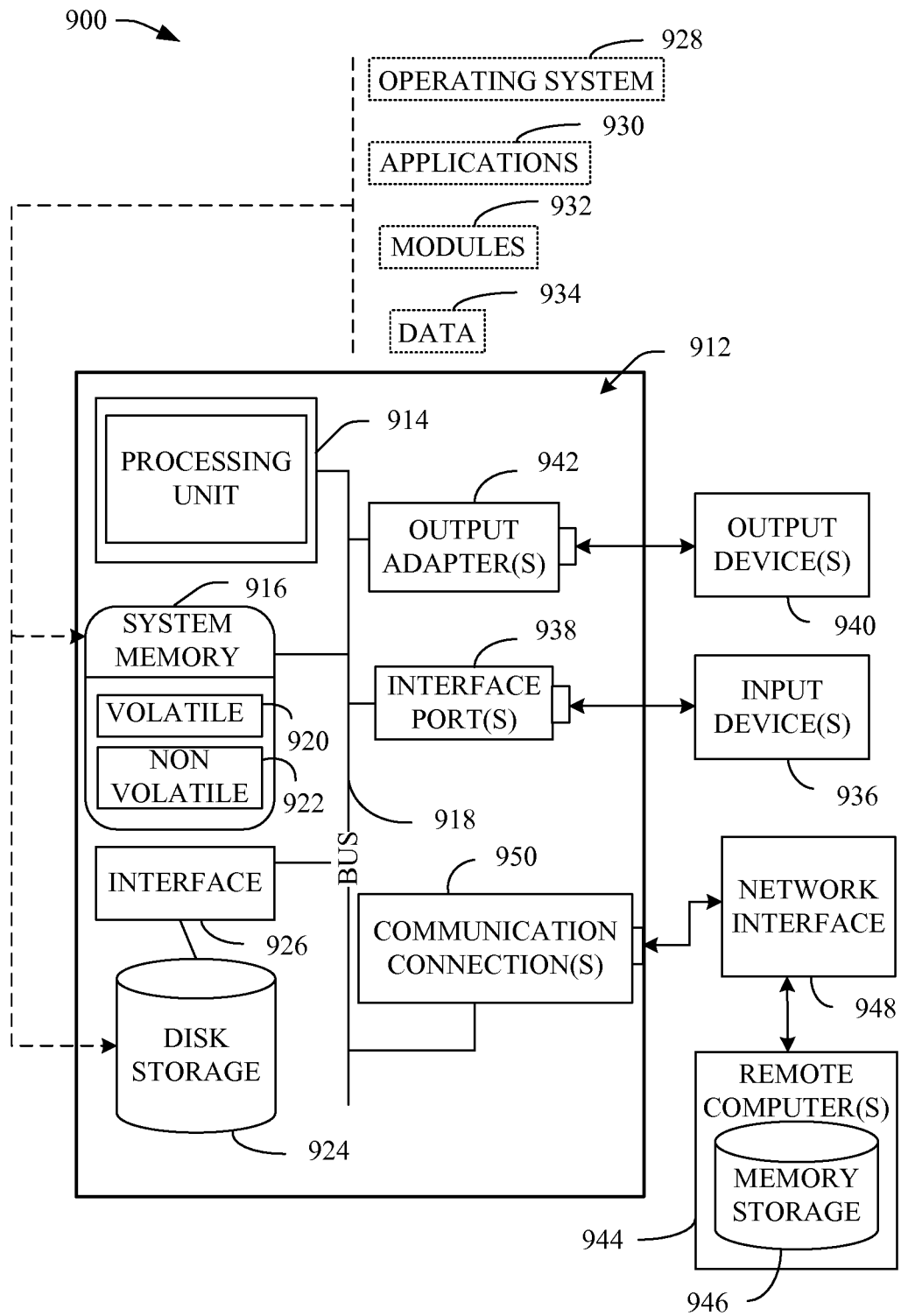
FIG. 9 is a schematic block diagram illustrating a suitable operating environment of the disclosed subject matter.
Figure 10:
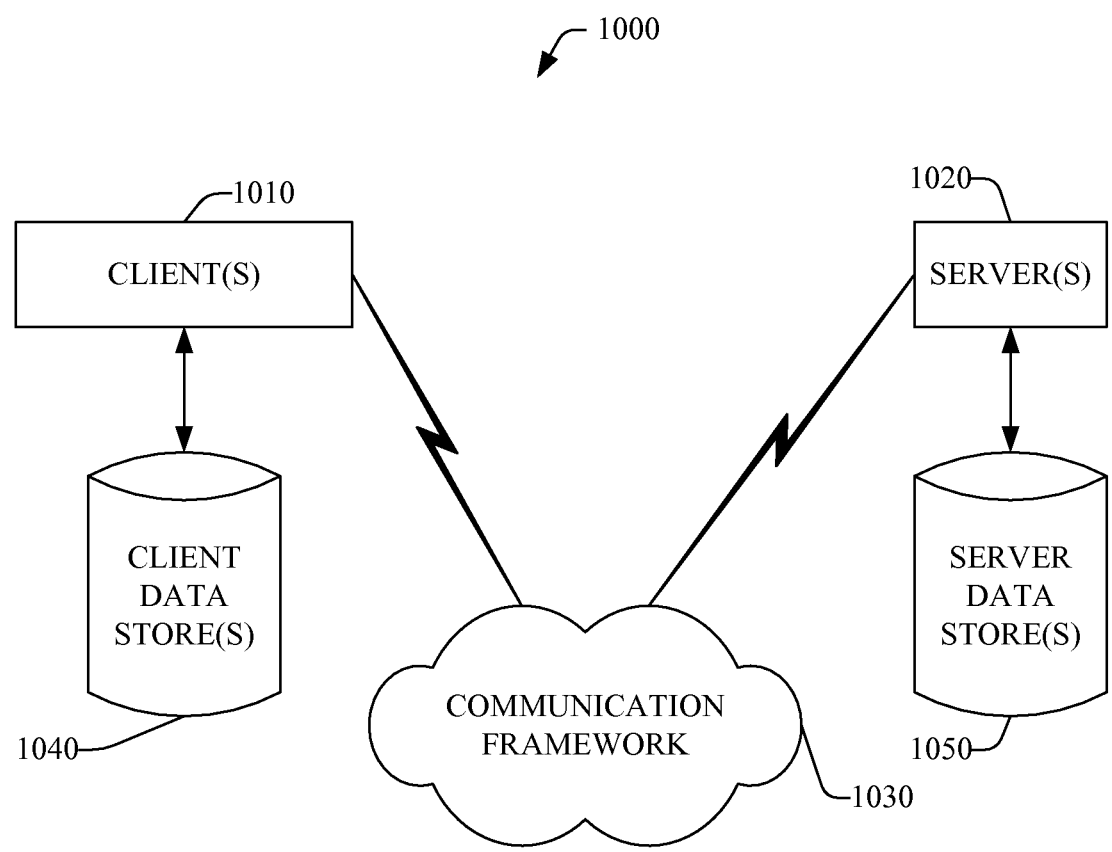
FIG. 10 is a schematic block diagram of a sample-computing environment of the disclosed subject matter.

In order to provide a context for the various aspects of the disclosed subject matter, FIGS. 9 and 10 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the disclosed subject matter also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., PDA, phone, watch), microprocessor-based or programmable consumer or industrial electronics, and the like. The illustrated aspects may also be practiced in distributed computing environments where tasks are performed by remote processing devices that are linked through a communications network. However, some, if not all aspects of the disclosed subject matter can be practiced on stand-alone computers. In a distributed computing environment, program modules may be located in both local and remote memory storage devices.

With reference to FIG. 9, a suitable environment 900 for implementing various aspects of the disclosed subject matter includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multi-processor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include ROM, PROM, electrically programmable ROM (EPROM), electrically erasable programmable ROM (EEPROM), or flash memory. Volatile memory 920 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 912 also includes removable/non-removable, volatile/non-volatile computer storage media. FIG. 9 illustrates, for example, a disk storage 924. Disk storage 924 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used, such as interface 926.

It is to be appreciated that FIG. 9 describes software that acts as an intermediary between users and the basic computer resources described in the suitable operating environment 900. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that the disclosed subject matter can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers, among other output devices 940, which require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for purposes of example only, internal and external technologies such as, modems including regular telephone grade modems, cable modems and DSL modems, ISDN adapters, and Ethernet cards.

FIG. 10 is a schematic block diagram of a sample-computing environment 1000 with which the disclosed subject matter can interact. The system 1000 includes one or more client(s) 1010. The client(s) 1010 can be hardware and/or software (e.g., threads, processes, computing devices). The system 1000 also includes one or more server(s) 1020. Thus, system 1000 can correspond to a two-tier client server model or a multi-tier model (e.g., client, middle tier server, data server), amongst other models. The server(s) 1020 can also be hardware and/or software (e.g., threads, processes, computing devices). The servers 1020 can house threads to perform transformations by employing the subject innovation, for example. One possible communication between a client 1010 and a server 1020 may be in the form of a data packet transmitted between two or more computer processes.

The system 1000 includes a communication framework 1030 that can be employed to facilitate communications between the client(s) 1010 and the server(s) 1020. The client(s) 1010 are operatively connected to one or more client data store(s) 1040 that can be employed to store information local to the client(s) 1010. Similarly, the server(s) 1020 are operatively connected to one or more server data store(s) 1050 that can be employed to store information local to the servers 1020.

What has been described above includes examples of aspects of the disclosed subject matter. It is, of course, not possible to describe every conceivable combination of components or methodologies for purposes of describing the disclosed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim.

What is claimed is:

1. A system that facilitates management of information in a network, the system comprising:
   an access control device configured to generate a physical access control event in response to input received at the access control device from a user in physical proximity to the access control device, the physical access control event including physical location information indicating the user's ingress to or egress from a particular physical location;
   one or more processing units;
   a unified access control component, executable by the one or more processing units, configured to enforce one or more network access policies of the network, the one or more network access policies defining a subset of network access privileges granted to the user based on a combination of varying levels of physical access rights and varying levels of network access rights, the physical access rights determined based on the physical access control event indicating the particular physical location of the user and the network access rights determined based on a network access event of the user, the one or more network access policies further including a policy to cause the unified access control component to deny network access to the user when the unified access control component detects a mismatch between the varying levels of physical access rights and the varying levels of network access rights; and
   a dynamic authentication component, associated with the unified access control component, configured to request authentication of the user prior to the subset of network access privileges being granted to the user and is further configured to requests re-authentication of the user, after the subset of network access privileges have been granted to the user, when at least one of the network access event of the user and the physical access control event of the user indicates a change in at least one of the particular physical location of the user and network access rights of the user.

2. The system of claim 1, wherein the dynamic authentication component is to request re-authentication when the change indicates that a subset of network access privileges associated with the change is different from the subset of network access privileges previously granted.

3. The system of claim 1, wherein the unified access control component is to generate the one or more network access policies, the one or more network access policies corresponding to a respective subset of network access privileges that specify particular information associated with the network that is available to be accessed by the user.

4. The system of claim 3, wherein each respective subset of network privileges is associated with a different security level associated with the information associated with the network.

5. The system of claim 1, wherein the access control device is at least one of a card reader, a biometric reader, a keypad, or a location sensor, or a combination thereof.

6. The system of claim 1, wherein the unified access control component comprises one or more computers.

7. The system of claim 1, wherein the unified access control component is to perform one of a suspension of network access or a termination of network access when, after the subset of network access privileges are granted, a change in at least one of the particular physical location and network access rights is detected.

8. A method for managing access to resources in a network, the method comprising:
   generating a physical access control event by an access control device, the physical access control event generated in response to input received at the access control device from a user in physical proximity to the access control device, the physical access control event including physical location information indicating the user's ingress to or egress from a particular physical location;
   enforcing a network access policy, the network access policy defining a subset of network access privileges granted to the user based on a combination of varying levels of physical access rights and varying levels of network access rights, the physical access rights determined based on the physical access control event indicating the particular physical location of the user and the network access rights determined based on a network access event of the user, the network access policy denying network access to the user when a mismatch is detected between the varying levels of physical access rights and the varying levels of network access rights;
   monitoring at least one of the network access rights of the user and the particular physical location of the user; and
   dynamically requesting re-authentication of the user when, after the user has been previously authenticated and granted the subset of network access privileges, a change is detected relating to at least one of the network access rights of the user and the particular physical location of the user.

9. The method of claim 8, further comprising:
   generating the network access policy; and
   downloading the network access policy.

10. The method of claim 8, further comprising:
   receiving a network access credential;
   referencing a list of network access credentials;
   comparing the received network access credential to the list of network access credentials;

validating the received network access credential;
referencing a list of network access policies; and
enforcing a network access policy associated with the received network access credential.

11. The method of claim 10, further comprising:
reading a physical access credential associated with the user;
referencing a list of physical access credentials;
comparing the physical access credential to the list of physical access credentials;
validating the read physical access credential;
referencing a list of physical access policies; and
enforcing a physical access policy associated with the read physical access credential.

12. A system to manage access to information in a network, the system comprising:
a monitor component configured to receive a physical access control event generated by an access control device, the physical access control event generated in response to input received at the access control device from a user in physical proximity to the access control device, the physical access control event including physical location information indicating the user's ingress to or egress from a particular physical location;
a dynamic network authentication component configured to enforce a network access policy, the network access policy defining a subset of network access privileges granted to the user based on a combination of varying levels of physical access rights and varying levels of network access rights, the physical access rights determined based on the physical access control event indicating the particular physical location of the user and the network access rights determined based on a network access event of the user, the network access policy further denying network access to the user when a mismatch is detected between the varying levels of physical access rights and the varying levels of network access rights;
a network access coordination component configured to monitor the network access rights, associated with the network, of the user who has been previously authenticated and granted the subset of network access privileges;
a physical security coordination component configured to monitor the particular physical location information of the user; and
the dynamic network authentication component further configured to dynamically request re-authentication of the user after the user has been previously authenticated and upon detecting a change in at least one of the particular physical location of the user and the network access rights of the user.

13. The system of claim 12, wherein the dynamic network authentication component is further configured to:
generate the network access policy.

* * * * *